United States Patent
Bae

(10) Patent No.: US 9,915,777 B2
(45) Date of Patent: Mar. 13, 2018

(54) CONTAINER OF QUANTUM DOT BAR AND BACKLIGHT UNIT COMPRISING THE SAME

(71) Applicant: Samsung Display Co., Ltd., Yongin, Gyeonggi-Do (KR)

(72) Inventor: Hyun Chul Bae, Suwon-si (KR)

(73) Assignee: Samsung Display Co., Ltd. (KR)

( * ) Notice: Subject to any disclaimer, the term of this patent is extended or adjusted under 35 U.S.C. 154(b) by 419 days.

(21) Appl. No.: 14/294,987

(22) Filed: Jun. 3, 2014

(65) Prior Publication Data
US 2015/0226904 A1 Aug. 13, 2015

(30) Foreign Application Priority Data

Feb. 11, 2014 (KR) .................. 10-2014-0015497

(51) Int. Cl.
| F21V 7/04 | (2006.01) |
|---|---|
| F21V 8/00 | (2006.01) |
| F21V 19/00 | (2006.01) |
| F21V 17/00 | (2006.01) |

(52) U.S. Cl.
CPC ......... G02B 6/0086 (2013.01); G02B 6/0023 (2013.01); *F21V 17/002* (2013.01); *F21V 19/0045* (2013.01); *G02B 6/009* (2013.01); *G02B 6/0026* (2013.01); *G02B 6/0068* (2013.01); *G02B 6/0073* (2013.01); *G02B 6/0088* (2013.01); *G02B 6/0091* (2013.01)

(58) Field of Classification Search
CPC .... G02B 6/0023; G02B 6/0026; G02B 6/003; G02B 6/0025; G02B 6/0031; G02B 6/0073; G02B 6/0086; G02B 6/0088; G02B 6/009; G02B 6/0091; F21V 19/0045; F21V 17/002; F21V 17/04; F21V 17/06
USPC ................................ 362/608, 609, 610, 612
See application file for complete search history.

(56) References Cited

U.S. PATENT DOCUMENTS

| 5,786,665 A * | 7/1998 | Ohtsuki | G02B 6/0021 313/113 |
|---|---|---|---|
| 6,443,584 B2 * | 9/2002 | Suzuki | 362/223 |
| 6,481,130 B1 * | 11/2002 | Wu | F21V 13/04 362/297 |
| 6,545,732 B2 * | 4/2003 | Nakano | G02B 6/0091 349/58 |
| 7,453,419 B2 * | 11/2008 | Yee | G02B 6/0091 345/36 |

(Continued)

FOREIGN PATENT DOCUMENTS

| JP | 2006-208722 | 8/2006 |
|---|---|---|
| JP | 2008-085232 | 4/2008 |

(Continued)

*Primary Examiner* — Bryon T Gyllstrom
*Assistant Examiner* — James Endo
(74) *Attorney, Agent, or Firm* — Innovation Counsel LLP

(57) ABSTRACT

A quantum dot bar container of a quantum dot bar and a backlight unit including the same is provided. In one embodiment, the quantum dot bar container includes a first fixing part including a first guide groove extending in a first direction, a second fixing part facing the first fixing part and including a second guide groove corresponding to the first guide groove, and a plurality of first connection parts each connecting the first fixing part and the second fixing part. The quantum dot bar including quantum dots is slidably inserted between the first guide groove and the second guide groove.

18 Claims, 12 Drawing Sheets

(56) References Cited

U.S. PATENT DOCUMENTS

| | | | | |
|---|---|---|---|---|
| 8,511,153 B2 | 8/2013 | Serra et al. | | |
| 2007/0247873 A1* | 10/2007 | Awai | .................... | G02B 6/0025 |
| | | | | 362/618 |
| 2008/0049445 A1* | 2/2008 | Harbers | ................. | G02B 6/002 |
| | | | | 362/612 |
| 2010/0283914 A1* | 11/2010 | Hamada | ............... | G02B 6/0026 |
| | | | | 348/731 |
| 2011/0292660 A1* | 12/2011 | Eichelberger | ........ | G02B 6/0006 |
| | | | | 362/311.02 |
| 2012/0118053 A1 | 5/2012 | Serra et al. | | |
| 2012/0188747 A1* | 7/2012 | Mine | .................... | G02B 6/0068 |
| | | | | 362/97.1 |
| 2012/0268656 A1* | 10/2012 | Takano | ................ | G02B 6/0025 |
| | | | | 348/725 |
| 2013/0050612 A1 | 2/2013 | Hur et al. | | |
| 2013/0128617 A1* | 5/2013 | Lee | ........................... | F21S 8/00 |
| | | | | 362/611 |
| 2013/0265784 A1* | 10/2013 | Nieberle | .................. | F21S 8/00 |
| | | | | 362/382 |
| 2013/0271700 A1* | 10/2013 | Nakamura | ........... | G02B 6/0026 |
| | | | | 349/65 |
| 2013/0271961 A1* | 10/2013 | Nakamura | ................ | F21V 9/00 |
| | | | | 362/97.2 |

FOREIGN PATENT DOCUMENTS

| | | |
|---|---|---|
| KR | 1020120068499 A | 6/2012 |
| KR | 1020120075015 A | 7/2012 |
| KR | 1020120075142 A | 7/2012 |
| KR | 1020120122654 A | 11/2012 |
| WO | WO 2013106553 A1 * 7/2013 | ............. G02B 6/003 |

\* cited by examiner

CONTAINER OF QUANTUM DOT BAR AND BACKLIGHT UNIT COMPRISING THE SAME

CROSS-REFERENCE TO RELATED APPLICATION

This application claims priority from Korean Patent Application No. 10-2014-0015497 filed on Feb. 11, 2014 in the Korean Intellectual Property Office, the disclosure of which is incorporated herein by reference in its entirety.

BACKGROUND

1. Field

The present application relates to a container of a quantum dot bar and a backlight unit comprising the same.

2. Description of the Related Art

A display device is a device for visually displaying data. Examples of the display device include a liquid crystal display, an electrophoretic display, an organic light emitting display, an electroluminescent display, a field emission display, a surface-conduction electron-emitter display, a plasma display, and a cathode ray display.

Among the display devices, the liquid crystal display is a display device capable of displaying a desired image by arranging a liquid crystal layer between two transparent panels and adjusting light transmittance for each pixel according to the driving of the liquid crystal layer.

Since liquid crystal displays do not produce light themselves, the liquid crystal display includes a separate light source unit installed in a backlight unit and adjusts the intensity of light transmitted through the liquid crystal installed in each pixel, thereby achieving a contrast. Here, the backlight unit including the light source unit is quite an important element in determining picture quality of the liquid crystal display, such as brightness, uniformity, and so on.

Recently, many attempts for increasing color purity of light emitted from a light source unit using quantum dots in a backlight unit are being made. That is to say, use of the quantum dots may increase the color purity of light emitted from the light source unit, and the light having increased color purity is transmitted to a display panel, thereby increasing sharpness of a picture in the display device.

However, the quantum dots are considerably vulnerable to external moisture and oxygen. Accordingly, it is necessary to isolate the quantum dots from external surroundings using a separate sealing member.

In particular, in an edge type backlight unit, quantum dots may be injected into a transparent tube to then be sealed. The tube used in sealing the quantum dots is defined as a quantum dot bar. In this case, in order to uniformly increase color purity of light emitted from a light source unit, it is necessary to stably fix the quantum dot bar between the light source unit and a light guide plate. In addition, it is necessary to simplify an assembling process of the quantum dot bar to increase efficiency of a manufacturing process of the backlight unit.

SUMMARY

One embodiment provides a container of a quantum dot bar, which can simplify an assembling process of the quantum dot bar while stably fixing the quantum dot bar.

Another embodiment provides a backlight unit including a container of a quantum dot bar, which can simplify an assembling process of the quantum dot bar while stably fixing the quantum dot bar.

The above and other features of the inventive concept will be described in or be apparent from the following description of the embodiments.

According to an aspect of the inventive concept, there is provided a quantum dot bar container of a quantum dot bar including a first fixing part including a first guide groove extending in a first direction, a second fixing part facing the first fixing part and including a second guide groove corresponding to the first guide groove, and a plurality of first connection parts each connecting the first fixing part and the second fixing part. The quantum dot bar including quantum dots is slidably inserted between the first guide groove and the second guide groove.

The first fixing part, the second fixing part and the plurality of first connection parts may be integrated into a single body.

The plurality of first connection parts may be positioned to be spaced a predetermine distance apart from each other along one side of each of the first guide groove and the second guide groove.

A plurality of first align holes may be formed between the plurality of first connection parts, and a light source that is configured to emit light may be inserted into each of the plurality of first align holes.

A second align hole may be formed at an other side of each of the first guide groove and the second guide groove facing the one side of each of the first guide groove and the second guide groove, and a light guide plate configured to guide light may be inserted into the second align hole.

The quantum dot bar container may further comprise at least one light guide plate guiding part positioned on at least one end of the second align hole.

The first fixing part may further include a first protruding part protruding toward the second fixing part, and the first protruding part is positioned between the first guide groove and the second align hole.

The quantum dot bar container may further comprise at least one second connection part connecting the first protruding part and the second fixing part.

The second connection part may be positioned to be adjacent to at least one end of each of the first guide groove and the second guide groove.

The second connection part may be positioned to face at least one of the plurality of first connection parts.

A length of the second connection part in the first direction may be smaller than that of a first connection part of the plurality of first connection parts in the first direction.

The first fixing part may further include a second protruding part protruding in an opposite direction to a direction in which the second fixing part protrudes.

According to another aspect of the inventive concept, there is provided a quantum dot bar container of a quantum dot bar including a first fixing part including a first guide groove extending in a first direction, a second fixing part facing the first fixing part and including a second guide groove corresponding to the first guide groove, and a plurality of connection parts each connecting the first fixing part and the second fixing part. The first fixing part, the second fixing part and the plurality of connection parts are integrated into a single body.

The quantum dot bar including quantum dots may be slidably inserted between the first guide groove and the second guide groove.

The plurality of connection parts may be positioned to be spaced a predetermine distance apart from each other along one side of each of the first guide groove and the second guide groove.

According to still another aspect of the inventive concept, there is provided a backlight unit comprising a plurality of light sources, a quantum dot bar, a quantum dot bar container, and a light guide plate. The plurality of light sources are arranged in a first direction and are configured to emit light. The quantum dot bar is positioned on the plurality of light sources and is configured to convert wavelengths of light emitted from the plurality of light sources. The quantum dot bar container accommodates the quantum dot bar. The light guide plate is positioned on the quantum dot bar container and is configured to guide the light whose wavelengths are converted from the quantum dot bar to a display panel. The quantum dot bar container comprises a first fixing part including a first guide groove extending in a first direction, a second fixing part facing the first fixing part and including a second guide groove corresponding to the first guide groove, and a plurality of connection parts each connecting the first fixing part and the second fixing part. The quantum dot bar including quantum dots is slidably inserted between the first guide groove and the second guide groove.

The first fixing part, the second fixing part and the plurality of connection parts may be integrated into a single body.

Each of the plurality of light sources may be positioned between the plurality of connection parts adjacent to each other.

One end of the light guide plate may be positioned between the first fixing part and the second fixing part.

The first fixing part may further include a protruding part protruding toward the second fixing part, and the protruding part is positioned between the quantum dot bar and the light guide plate.

According to the inventive concept, a quantum dot bar can be stably fixed in a backlight unit.

In addition, the efficiency of a manufacturing process of a backlight unit can be increased by simplifying an assembling process of a quantum dot bar.

BRIEF DESCRIPTION OF THE DRAWINGS

The above and other features of the inventive concept will become more apparent by describing in detail embodiments thereof with reference to the attached drawings in which.

DETAILED DESCRIPTION

Figure 1:
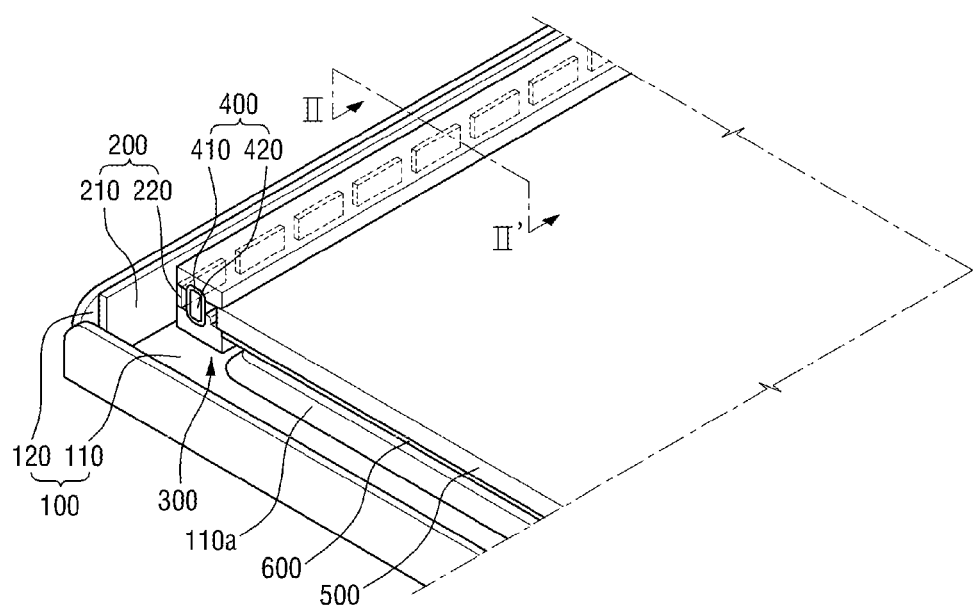
FIG. 1 is a perspective view of a backlight unit according to an embodiment.

The aspects and features of the inventive concept and methods for achieving the aspects and features will be apparent by referring to the embodiments to be described in detail with reference to the accompanying drawings. However, the inventive concept is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the inventive concept, and the inventive concept is only defined within the scope of the appended claims.

The term "on" that is used to designate that an element is on another element or located on a different layer or a layer includes both a case where an element is located directly on another element or a layer and a case where an element is located on another element via another layer or still another element. In the entire description, the same drawing reference numerals are used for the same elements across various figures.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

Hereinafter, embodiments will be described in further detail with reference to the accompanying drawings.

Figure 2:
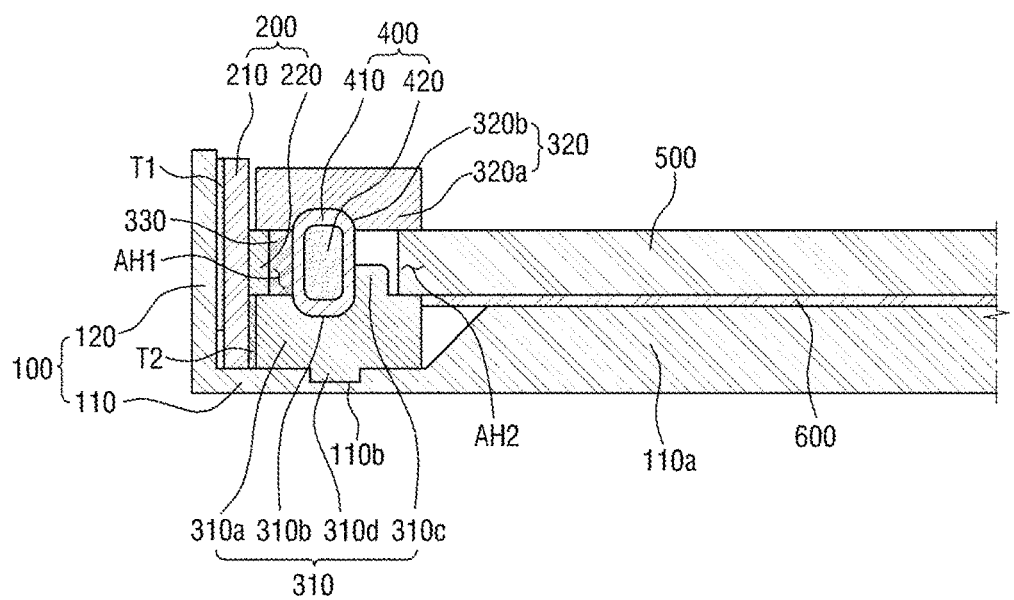
FIG. 2 is a cross-sectional view taken along the line II-II' of FIG. 1.

FIG. 1 is a perspective view of a backlight unit according to an embodiment and FIG. 2 is a cross-sectional view taken along the line II-II' of FIG. 1.

Referring to FIGS. 1 and 2, the backlight unit according to an embodiment may include a bottom chassis 100, a light source unit 200, a quantum dot bar container 300, a quantum dot bar 400, a light guide plate 500, and a reflection plate 600.

The bottom chassis 100 may receive the light source unit 200, the quantum dot bar container 300, the quantum dot bar 400, the light guide plate 500, and the reflection plate 600 while protecting these elements from external shocks. The bottom chassis 100 may be made of a rigid metallic material, but aspects of the inventive concept are not limited thereto.

The bottom chassis 100 may include a bottom part 110 and a sidewall part 120. Here, the sidewall part 120 may protrude from an edge of the bottom part 110 to be perpendicular to the bottom part 110, but aspects of the inventive concept are not limited thereto.

When necessary, the bottom part 110 and the sidewall part 120 may form an acute angle or an obtuse angle. When the bottom part 110 is shaped of a parallelepiped plate, the sidewall part 120 may have four sidewalls.

The bottom part 110 may include a mounting part 110*a* and a fastening groove 110*b*. Here, the mounting part 110*a* may means a part on which the light guide plate 500 is placed. The mounting part 110*a* may be centrally positioned in the bottom part 110. The mounting part 110a may convexly protrude toward the light guide plate 500. Meanwhile, the fastening groove 110b may be formed between the light source unit 200 and the light guide plate 500. A portion of the quantum dot bar container 300 may be inserted into the fastening groove 110b to then be fixed. That is to say, the fastening groove 110b may function as a guide when the quantum dot bar container 300 is assembled with the bottom chassis 100.

The light source unit 200 may be positioned on an inner surface of the sidewall part 120 of the bottom chassis 100. The light source unit 200 may be formed on only one sidewall of the sidewall part 120, but aspects of the inventive concept are not limited thereto. Rather, the light source unit 200 may also be formed on two sidewalls facing each other. In addition, the light source unit 200 may extend in a first direction. Here, the first direction is a direction in which the sidewall part 120 extends. In addition, the first direction may be a direction parallel to an incident surface of the light guide plate 500. The light source unit 200 may include a circuit board 210 and light sources 220.

The circuit board 210 may be positioned on the inner surface of the sidewall part 120. The circuit board 210 may be connected to a power supply (not shown) to then transmit electrical energy to the light sources 220. The circuit board 210 may face the incident surface of the light guide plate 500, and a surface of the circuit board 210 facing the incident surface of the light guide plate 500 may be shaped to correspond to the incident surface of the light guide plate 500. In an exemplary embodiment, the surface of the circuit board 210 may be parallel to the incident surface of the light guide plate 500. That is to say, the circuit board 210 may extend in the first direction. In addition, an area of the circuit board 210 may be substantially equal to that of the incident surface of the light guide plate 500.

The plurality of light sources 220 may be disposed on one surface of the circuit board 210. The plurality of light sources 220 may convert the electrical energy transmitted through the circuit board 210 to optical energy. The plurality of light sources 220 may be arranged in the first direction. The plurality of light sources 220 may be arranged to be spaced a predetermined distance apart from each other. In addition, the plurality of light sources 220 may be arranged in a line. In addition, the plurality of light sources 220 may be arranged to correspond to the shape of the incident surface of the light guide plate 500. In addition, the plurality of light sources 220 may be light emitting diodes (LEDs). In addition, the plurality of light sources 220 may emit blue light. In an exemplary embodiment, each of the plurality of light sources 220 may be a blue LED, but aspects of the inventive concept are not limited thereto.

A first adhesion member T1 may be interposed between the light source unit 200 and the sidewall part 120. The first adhesion member T1 may extend in the first direction. In an exemplary embodiment, the first adhesion member T1 may be a heat radiating tape. The heat radiating tape transmits the heat generated from the light source unit 200 to the bottom chassis 100, thereby preventing the light source unit 200 and components around the light source unit 200 from deteriorating.

The quantum dot bar container 300 may be positioned on the light source unit 200. The quantum dot bar container 300 may mix light emitted from the light source unit 200 while receiving the quantum dot bar 400. The quantum dot bar container 300 may extend in the first direction. The quantum dot bar container 300 will later be described in detail.

A second adhesion member T2 may be interposed between the quantum dot bar container 300 and the light source unit 200. In detail, the second adhesion member T2 may make direct contact with one surface of the circuit board 210 facing the light guide plate 500 and one surface of the quantum dot bar container 300 facing the one surface of the circuit board 210. In an exemplary embodiment, the second adhesion member T2 may be a double-sided tape, which may stably fix the quantum dot bar container 300 and the light source unit 200.

The quantum dot bar 400 may be received in the quantum dot bar container 300 to form a quantum dot bar assembly. The quantum dot bar 400 may convert a wavelength of light emitted from the light source unit 200. In detail, the quantum dot bar 400 may convert the wavelength of the light emitted from the light source unit 200 so as to be lengthened. For example, when the light sources 220 emit blue light, the quantum dot bar 400 may convert the blue light into white light. The quantum dot bar 400 may extend in the first direction. The quantum dot bar 400 may include a quantum dot container tube 410 and quantum dots 420.

The quantum dot container tube 410 may receive the quantum dots 420. The quantum dot container tube 410 may extend in the first direction. The quantum dot container tube 410 may perfectly seal the quantum dots 420. In an exemplary embodiment, the quantum dot container tube 410 may be formed of a transparent glass tube, but aspects of the inventive concept are not limited thereto. The quantum dot container tube 410 may be formed of any material so long as it is a transparent material capable of protecting the quantum dots 420 from external moisture and oxygen.

The quantum dots 420 may be positioned within in the quantum dot container tube 410. The blue light incident into the quantum dots 420 may be wavelength-converted into high-purity white light. The quantum dots 420 are semiconductor nano particles of a core-shell structure having particle sizes of several nanometers to several tens of nanometers. The quantum dots 420 demonstrate different colors of light emitted according to the size of a particle having a quantum confinement effect. In more detail, the quantum dots 420 emit intense light in a narrow wavelength range and the light emitted from the quantum dots 420 is generated by unstable (excited) electrons from a conduction band to a valence band. Here, the quantum dots 420 show characteristics in which light having a shorter wavelength is emitted as the particle size of the quantum dots 420 becomes smaller, and light having a longer wavelength is emitted as the particle size of the quantum dots 420 becomes larger. Therefore, the light having a desired wavelength in a visible light range may be obtained by adjusting the size of the quantum dots 420.

The quantum dots 420 may include one of silicon (Si)-based nano crystals, Group II-VI-based compound semiconductor nano crystals, Group III-V-based compound semiconductor nano crystals, Group IV-VI-based compound semiconductor nano crystals, and mixtures thereof.

The Group II-VI-based compound semiconductor nano crystals may be formed of one selected from the group consisting of CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe and HgZnSTe.

The Group III-V-based compound semiconductor nano crystals may be formed of one selected from the group consisting of GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs. The Group IV-VI-based compound semiconductor nano crystals may be formed of SbTe.

The light guide plate 500 may be positioned on the mounting part 110a of the bottom chassis 100. One end of the light guide plate 500 may be inserted into the quantum dot bar container 300. One surface of the light guide plate 500 inserted into the quantum dot bar container 300 may be an incident surface, and the light guide plate 500 may receive the light through the incident surface. In detail, the light guide plate 500 may guide the light emitted from the light source unit 200 and wavelength-converted from the quantum dot bar 400 and may transfer the light to an upper portion of the light guide plate 500.

The light guide plate 500 may be made of a transparent material. In an exemplary embodiment, the light guide plate 500 may include polymethylmethacrylate (PMMA), but aspects of the inventive concept are not limited thereto. The light guide plate 500 may be made of a variety of transparent materials capable of guiding light. In addition, the light guide plate 500 may be made of a rigid material, but aspects of the inventive concept are not limited thereto. The light guide plate 500 may also be made of a flexible material.

The light guide plate 500 may be shaped of a parallelepiped plate. Throughout the specification, embodiments will be described with regard to the light guide plate 500 shaped of a parallelepiped plate, but the embodiments are not limited thereto. Embodiments may be applied to the light guide plate 500 having a wide variety of shapes.

The reflection plate 600 may be positioned under the light guide plate 500. In detail, the reflection plate 600 may be interposed between the light guide plate 500 and the mounting part 110a of the bottom chassis 100. In addition, as shown, the reflection plate 600 may not be inserted into the quantum dot bar container 300, unlike the light guide plate 500, but aspects of the inventive concept are not limited thereto. Like the light guide plate 500, the reflection plate 600 may be inserted into the quantum dot bar container 300. The reflection plate 600 may change the path of light travelling toward a lower side of the light guide plate 500 to an upper side of the light guide plate 500. The reflection plate 600 may be made of a reflective material, e.g., a metal.

Figure 3:
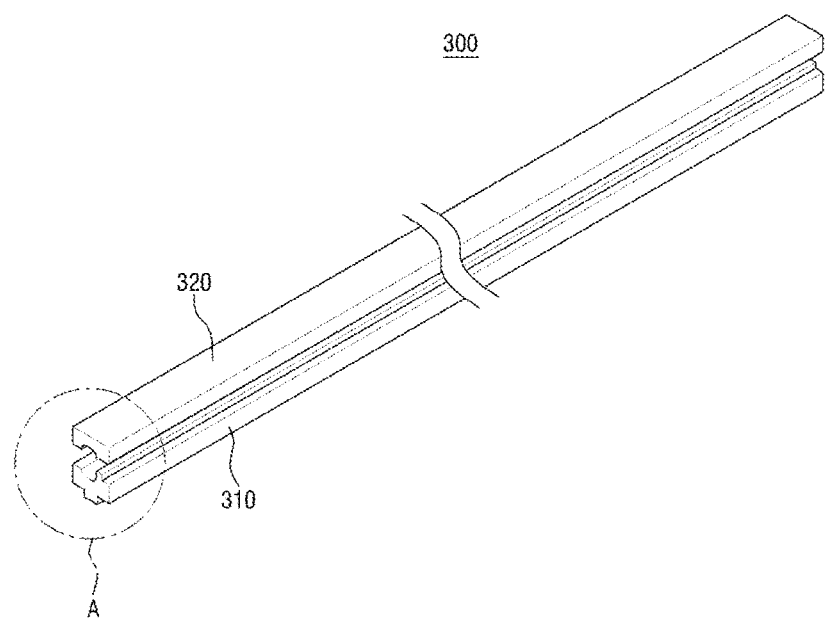
FIG. 3 is a perspective view of a quantum dot bar container of FIG. 1.
Figure 4:
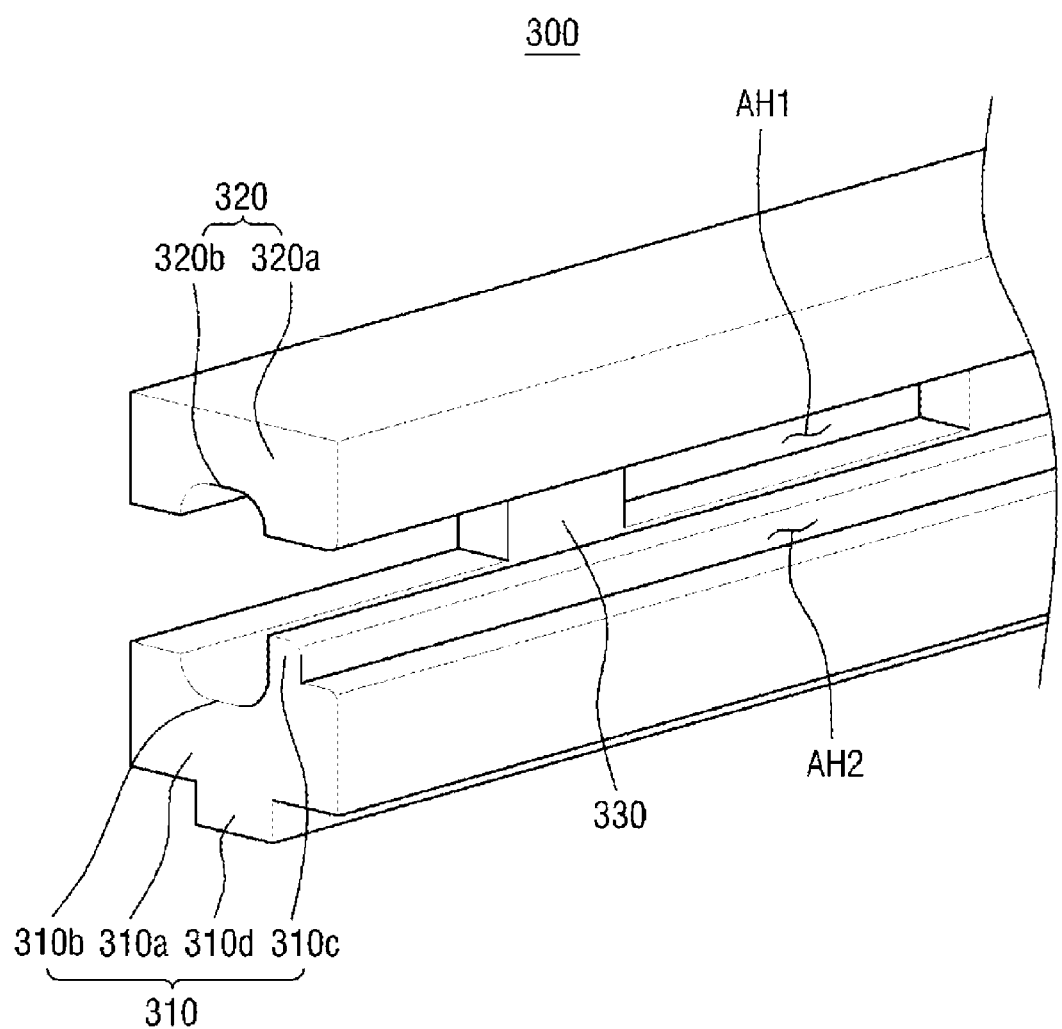
FIG. 4 is a front perspective view illustrating a portion 'A' of FIG. 3.
Figure 5:
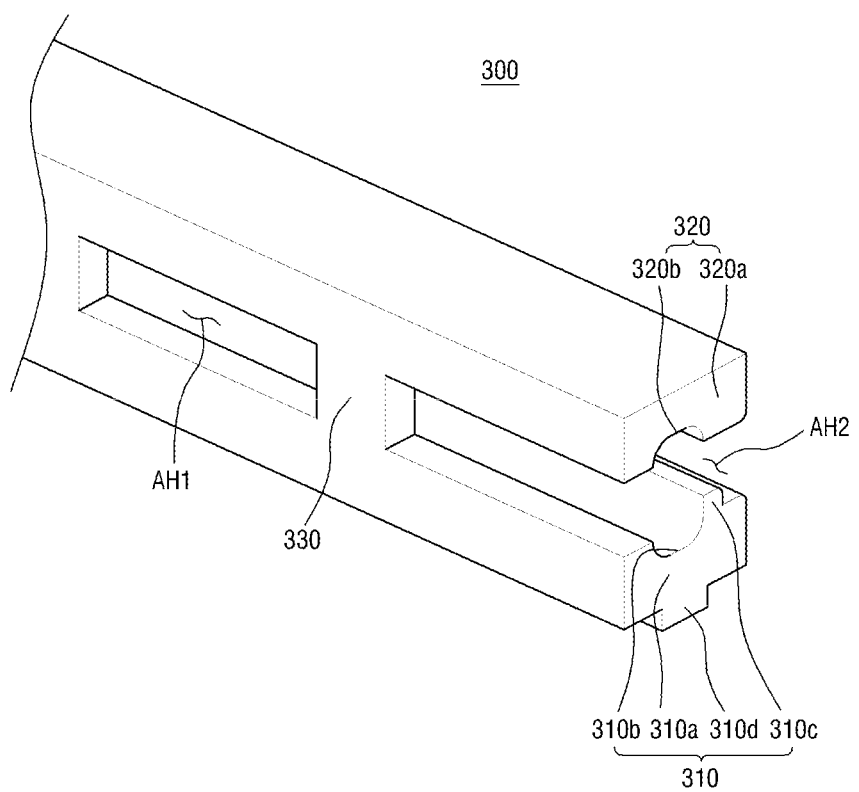
FIG. 5 is a rear perspective view illustrating the portion 'A' of FIG. 3.

Hereinafter, the quantum dot bar container 300 according to an embodiment will be describe in further detail with reference to FIGS. 2 to 5. FIG. 3 is a perspective view of a quantum dot bar container of FIG. 1, FIG. 4 is a front perspective view illustrating a portion 'A' of FIG. 3 and FIG. 5 is a rear perspective view illustrating the portion 'A' of FIG. 3.

Referring to FIGS. 2 to 5, the quantum dot bar container 300 according to an embodiment may include a first fixing part 310, a second fixing part 320, and a plurality of connection parts 330.

The first fixing part 310 may be positioned under the quantum dot bar 400. The first fixing part 310 may fix the quantum dot bar 400 under the quantum dot bar 400. The first fixing part 310 may include a first base part 310a, a first guide groove 310b, a first protruding part 310c, and a second protruding part 310d.

The first base part 310a may be positioned at the center of the first fixing part 310. The first base part 310a may form the basis of the first fixing part 310. The first base part 310a may extend in the first direction. The first base part 310a may be made of a metallic material, but aspects of the inventive concept are not limited thereto. The first base part 310a may also be made of a polymer plastic material.

The first guide groove 310b may be formed on a top surface of the first base part 310a. The first guide groove 310b may extend in the first direction. The first guide groove 310b may support a bottom portion of the quantum dot bar 400. In an exemplary embodiment, the first guide groove 310b may be shaped to correspond to the bottom portion of the quantum dot bar 400.

The first protruding part 310c may be interposed between the quantum dot bar 400 and the light guide plate 500. In other words, the first protruding part 310c may be interposed between the first guide groove 310b and a second align hole AH2 to be described later. The first protruding part 310c may extend in the first direction. In addition, the first protruding part 310c may protrude from the first base part 310a to the second fixing part 320. In addition, the first protruding part 310c may be maintained to be spaced a predetermined distance apart from the second fixing part 320. Here, the light emitted from the light source unit 200 and wavelength-converted from the quantum dot bar 400 may pass through a region between the first protruding part 310c and the second fixing part 320.

The second protruding part 310d may be positioned under the first base part 310a. The second protruding part 310d may extend in the first direction. In addition, the second protruding part 310d may protrude from the first base part 310a to the opposite direction to the direction in which the second fixing part 320 protrudes. The second protruding part 310d may be inserted into the fastening groove 110b of the bottom chassis 100 to fix the quantum dot bar container 300. That is to say, the second protruding part 310d may function as a guide when the quantum dot bar container 300 is assembled with the bottom chassis 100.

The second fixing part 320 may be positioned on the quantum dot bar 400. The second fixing part 320 may fix the quantum dot bar 400 on the quantum dot bar container 300. The second fixing part 320 may include a second base part 320a and a second guide groove 320b.

The second base part 320a may be positioned at the center of the second fixing part 320. The second base part 320a may form the basis of the second fixing part 320. The second base part 320a may extend in the first direction. The second base part 320a may be made of a metallic material, but aspects of the inventive concept are not limited thereto. The second base part 320a may be made of a polymer plastic material.

The second guide groove 320b may be formed on a bottom surface of the second base part 320a. The second guide groove 320b may correspond to the first guide groove 310b. That is to say, the second guide groove 320b may face the first guide groove 310b. The second guide groove 320b may extend in the first direction. The second guide groove 320b may support a top portion of the quantum dot bar 400. In an exemplary embodiment, the second guide groove 320b may be shaped to correspond to the top portion of the quantum dot bar 400.

The quantum dot bar 400 may be slidably inserted between the first guide groove 310b and the second guide groove 320b. For example, after the quantum dot bar 400 is inserted into the portion 'A' of FIG. 3, the quantum dot bar 400 is pushed in the first direction, so that a portion between the first guide groove 310b and the second guide groove 320b may be filled with the quantum dot bar 400. As described above, the quantum dot bar 400 is slidably inserted between the first guide groove 310b and the second guide groove 320b, thereby easily housing the quantum dot bar 400 in the quantum dot bar container 300.

The plurality of connection parts 330, inserted between the first fixing part 310 and the second fixing part 320, may connect the first fixing part 310 and the second fixing part 320 to each other. In an exemplary embodiment, the plurality of connection parts 330 may be positioned to be spaced a predetermine distance apart from each other along one side of each of the first guide groove 310b and the second guide groove 320b. Here, the one side of each of the first guide groove 310b and the second guide groove 320b may be adjacent to the light source unit 200. In detail, the plurality of connection parts 330 may be interposed between the circuit board 210 and the quantum dot bar 400.

A plurality of first align holes AH1 may be formed between the plurality of connection parts 330. That is to say, one of the first align holes AH1 may be formed between adjacent ones of the plurality of connection parts 330. The light sources 220 may be inserted into the plurality of first align holes AH1, respectively. That is to say, the plurality of first align holes AH1 may function as guides when the quantum dot bar container 300 is assembled with the light source unit 200. In addition, the plurality of first align holes AH1 may function to transfer the light emitted from the light sources 220 to the quantum dot bar 400.

The second align hole AH2 may be formed at a portion facing the first align hole AH1. In detail, the second align hole AH2 may be formed at the other side of each of the first guide groove 310b and the second guide groove 320b facing the one side of each of the first guide groove 310b and the second guide groove 320b. In other words, the second align hole AH2 may mean a space between the first fixing part 310 and the second fixing part 320 outside the first protruding part 310c. The second align hole AH2 may be one in number, unlike the first align holes AH1, and one end of the light guide plate 500 may be inserted into the second align hole AH2. That is to say, the second align hole AH2 may function as a guide when the light guide plate 500 is inserted into the quantum dot bar container 300.

That is to say, the quantum dot bar container 300 according to an embodiment may not require a separate assembling guide because the second protruding part 310d, the first align hole AH1, and the second align hole AH2 are coupled to the fastening groove 110b, the light source 220 and the light guide plate 500 of the bottom chassis 100, respectively. In addition, the quantum dot bar container 300 stably supports the bottom chassis 100, the light source unit 200 and the light guide plate 500 positioned around the quantum dot bar container 300, thereby enhancing mechanical strength of the display device including the respective elements.

In addition, the first fixing part 310, the second fixing part 320 and the connection part 330 may be integrated into a single body. In an exemplary embodiment, the first fixing part 310, the second fixing part 320 and the connection part 330 may be manufactured in a single mold at once. As described above, since the first fixing part 310, the second fixing part 320 and the connection part 330 are integrated into a single body, the quantum dot bar 400 can be received more stably. If the first fixing part 310 and the second fixing part 320 include separate parts, they may be spaced apart from each other due to thermal expansion of the light guide plate 500. As the result, the quantum dot bar 400 may be damaged by the expanded light guide plate 500. However, since the first fixing part 310, the second fixing part 320 and the connection part 330 are integrated into a single body, there is no probability that the second fixing part 320 and the connection part 330 are spaced apart from each other even by expansion of the light guide plate 500. In addition, since the distance between the quantum dot bar 400 and the light guide plate 500 is maintained by the first protruding part 310c of the first fixing part 310, there is no risk of the quantum dot bar 400 being damaged by the light guide plate 500.

Figure 6:
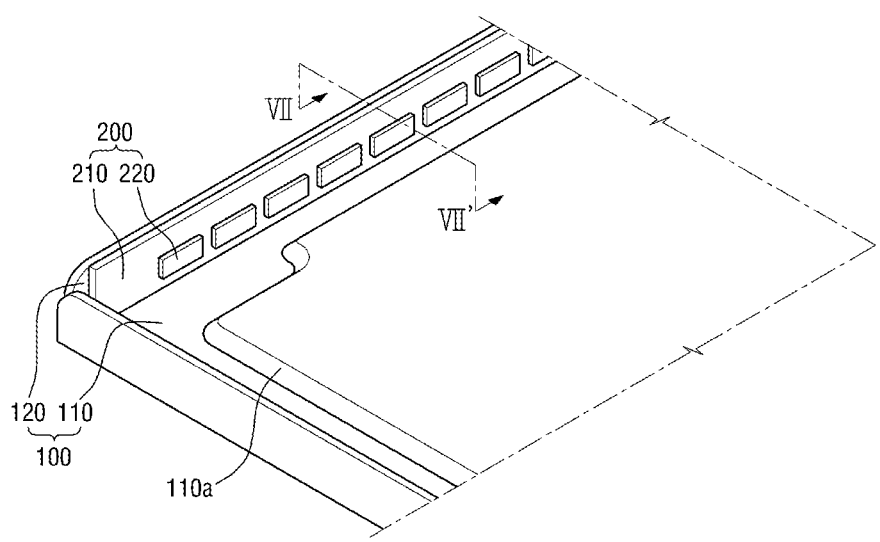
FIG. 6 is a perspective view illustrating a step of coupling a light source unit to a bottom chassis.
Figure 7:
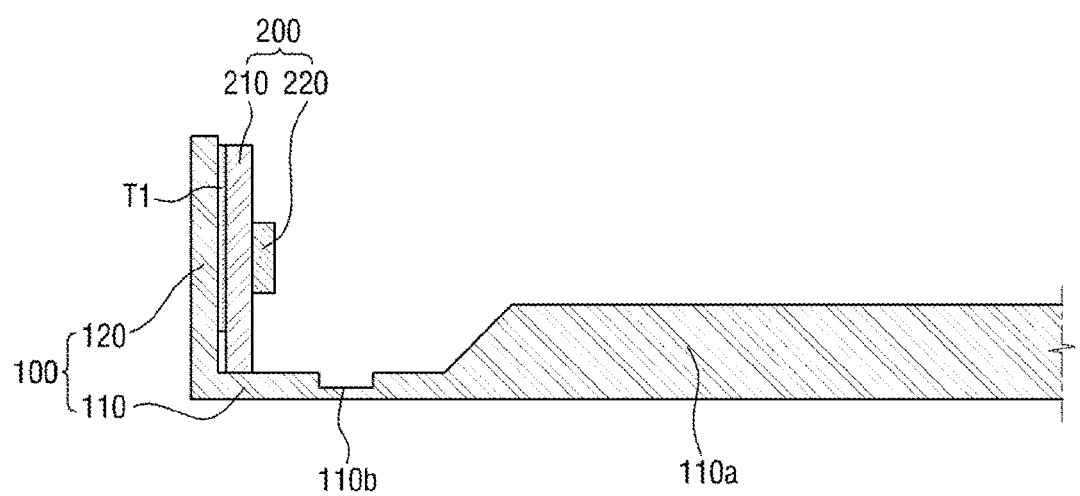
FIG. 7 is a cross-sectional view taken along the line VII-VII' of FIG. 6.
Figure 8:
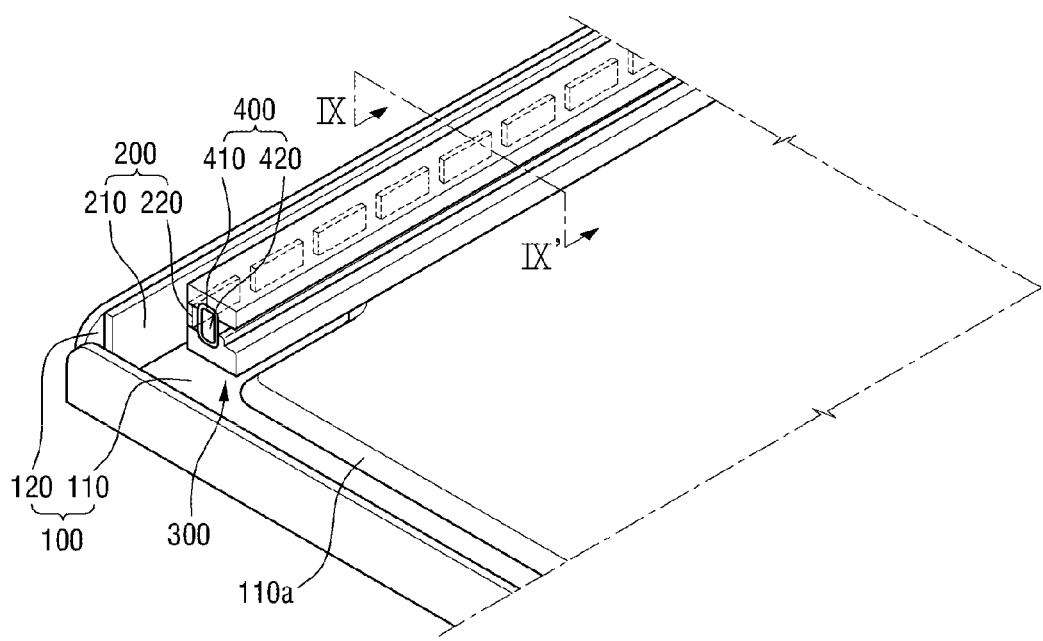
FIG. 8 is a perspective view illustrating a step of coupling quantum dot bar container including a quantum dot bar to a light source unit.
Figure 9:
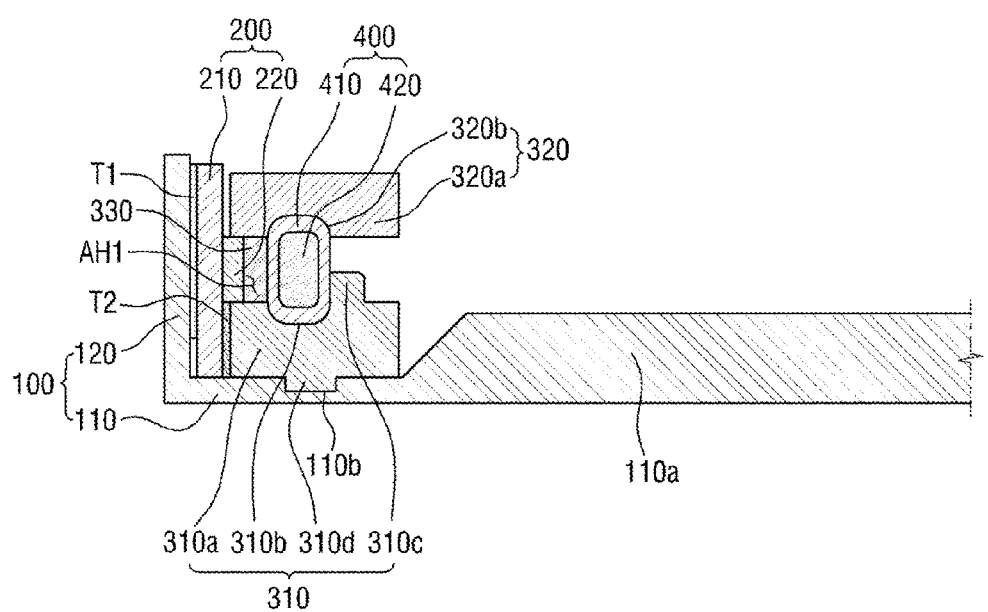
FIG. 9 is a cross-sectional view taken along the line IX-IX' of FIG. 8.
Figure 10:
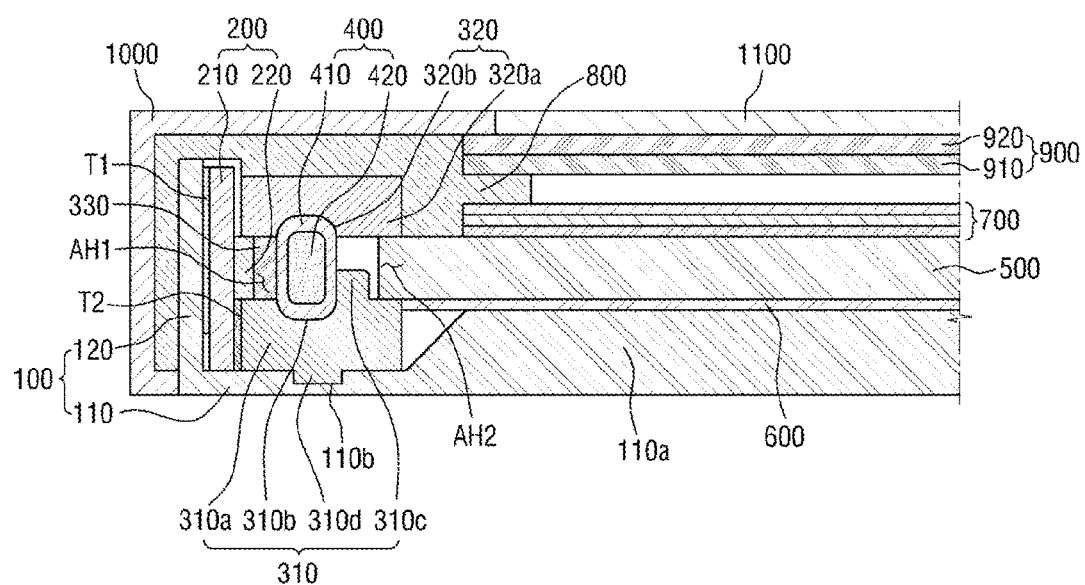
FIG. 10 is a cross-sectional view of a display device including the backlight unit shown in FIG. 1.

Hereinafter, a method for manufacturing method of the backlight unit shown in FIG. 1 will be described with reference to FIGS. 6 to 9. FIG. 6 is a perspective view illustrating a step of coupling a light source unit to a bottom chassis, FIG. 7 is a cross-sectional view taken along the line VII-VIP of FIG. 6, FIG. 8 is a perspective view illustrating a step of coupling quantum dot bar container including a quantum dot bar to a light source unit, FIG. 9 is a cross-sectional view taken along the line IX-IX' of FIG. 8 and FIG. 10 is a cross-sectional view of a display device including the backlight unit shown in FIG. 1. For the sake of convenient explanation, substantially the same elements as those of the previous embodiment are denoted by the same reference numerals, and repeated descriptions thereof will be omitted.

First, referring to FIGS. 6 and 7, the light source unit 200 is attached to the inner surface of the sidewall part 120 of the bottom chassis 100. Here, the sidewall part 120 and the light source unit 200 may be coupled to each other by the first adhesion member T1.

Next, referring to FIGS. 8 and 9, after the quantum dot bar 400 is slidably coupled to the quantum dot bar container 300, the quantum dot bar container 300 including the quantum dot bar 400 is coupled to the light source unit 200 and the bottom chassis 100. Here, after the second protruding part 310d and the fastening groove 110b are first coupled to each other, the first align holes AH1 and the light sources 220 are then coupled to each other, but aspects of the inventive concept are not limited thereto. The second protruding part 310d and the fastening groove 110, and the first align holes AH1 and the light sources 220 may be simultaneously coupled to each other.

Next, referring again to FIGS. 1 and 2, after the reflection plate 600 is disposed on the mounting part 110a of the bottom chassis 100, the light guide plate 500 is disposed on the reflection plate 600 such that one end of the light guide plate 500 is engaged with the second align hole AH2. That is to say, the light guide plate 500 may be inserted between the first fixing part 310 and the second fixing part 320.

As described above, the quantum dot bar container 300 according to the embodiment may simplify the assembling process of the backlight unit, thereby reducing the manufacturing cost and time of the backlight unit.

Hereinafter, a display device including the backlight unit shown in FIG. 1 will be described with reference to FIG. 10. FIG. 10 is a cross-sectional view of a display device including the backlight unit shown in FIG. 1. For the sake of convenient explanation, substantially the same elements are denoted by the same reference numerals, and repeated descriptions thereof will be omitted.

Referring to FIG. 10, the display device may include an optical sheet 700 disposed on the backlight unit, a mold frame 800, a display panel 900, a top chassis 1000, and a window 1100.

The optical sheet 700 may be disposed on the light guide plate 500. The optical sheet 700 may perform a function of modulating optical characteristics of the light emitted from the light guide plate 500. In an exemplary embodiment, the optical sheet 700 may include a plurality of optical sheets, and the plurality of optical sheets 700 may be sequentially stacked one on another, thereby compensating for various functions performed thereby. For example, the plurality of optical sheets 700 may include at least one of a prism sheet, a diffusion sheet, and a protective sheet.

The mold frame 800 is disposed on the edge of the bottom chassis 100 and may cover the sidewall part 120 of the bottom chassis 100, the light source unit 200, the quantum dot bar container 300, and the edge of the optical sheet 700. The mold frame 800 is engaged with the bottom chassis 100 and the top chassis 1000 and may fix the components of the backlight unit while supporting the display panel 900. The mold frame 800 may be made of a metallic material or a polymer plastic material.

The display panel 900 may be disposed on the mold frame 800. The display panel 900 may display an image. The display panel 900 may be one of a liquid crystal display (LCD) panel, an electrophoretic display panel, an organic light emitting display (LED) panel, an inorganic electroluminescent (EL) display panel, a field emission display (FED) panel, a surface-conduction electron-emitter display (SED) panel, a plasma display panel (PDP), and a cathode ray display (CRT) panel. Throughout the specification, the display device according to an embodiment will be described with regard to an LCD by way of example, and the display panel 900 will be described with regard to an LCD panel by way of example. However, the inventive concept does not limit the display device and the display panel 900 to those stated above, but various types of display devices and display panels may be used.

The display panel 900 may include a first display panel 910, a second display panel 920 facing the first display panel 910, and a liquid crystal layer (not shown) interposed between the first display panel 910 and the second display panel 920. Each of the first display panel 910 and the second display panel 920 may have a parallelepiped shape, but not limited thereto. The first display panel 910 and the second display panel 920 may have various shapes.

The top chassis 1000 may be positioned on the mold frame 800 and the edge of the display panel 900. The top chassis 1000 may be engaged with the mold frame 800 and the bottom chassis 100 to stably receive the display panel 900 and the backlight unit. The top chassis 1000 may be made of the same material as that of the bottom chassis 100.

The window 1100 may be disposed on the display panel 900. In addition, the window 1100 may be surrounded with the edge of the top chassis 1000. The window 1100 may be made of a transparent glass material and may protect the display panel 900 from external surroundings.

Figure 11:
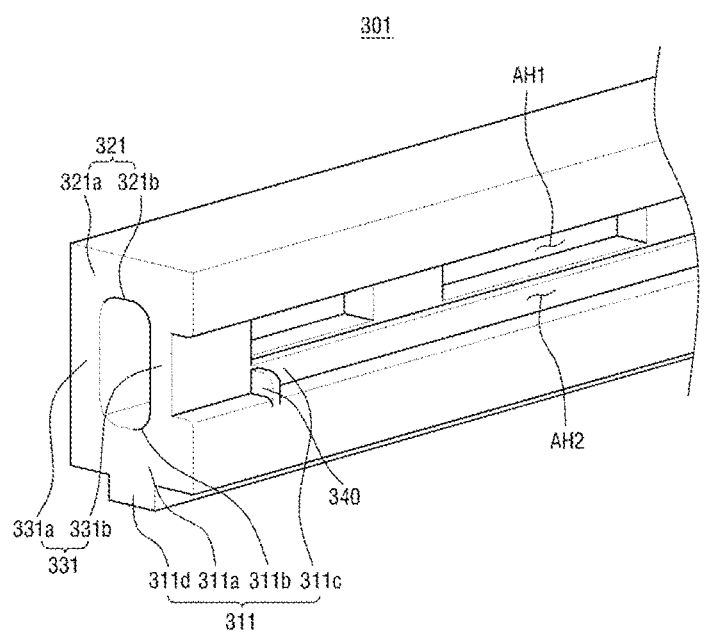
FIG. 11 is a perspective view illustrating a quantum dot bar container of a backlight unit according to another embodiment.

FIG. 11 is a perspective view illustrating a quantum dot bar container of a backlight unit according to another embodiment. For the sake of convenient explanation, substantially the same elements as those of the previous embodiment are denoted by the same reference numerals, and repeated descriptions thereof will be omitted.

Referring to FIG. 11, lengths of a first fixing part 311 and a second fixing part 321 in a first direction may be increased, compared to the previous embodiment. That is to say, lengths of a first base part 311a, a first guide groove 311b, a first protruding part 311c, and a second protruding part 311d of the first fixing part 311 in the first direction and lengths of a second base part 321a and a second guide groove 321b of the second fixing part 321 in the first direction may be both increased. Accordingly, the quantum dot bar container 301 fully covers the outermost light source 220, thereby stably protecting the light source 220.

Meanwhile, a connection part 331 may include a first connection part 331a and a second connection part 331b. Here, the first connection part 331a may be substantially the same as the connection part 330 of the previous embodiment. The second connection part 331b may connect the first protruding part 311c and the second fixing part 321 to each other. That is to say, the first connection part 331a may be positioned in the left of a quantum dot bar 400 and the second connection part 331b may be positioned in the right of the quantum dot bar 400. In other words, the first connection part 331a may be positioned at one side of each of the first guide groove 311b and the second guide groove 321b, and the second connection part 331b may be positioned at the other side of each of the first guide groove 311b and the second guide groove 321b, facing the one side of each of the first guide groove 311b and the second guide groove 321b. The first connection part 331a may include a plurality of first connection parts, and the plurality of first connection parts 331a may be positioned to be spaced a predetermined distance apart from each other. Meanwhile, the second connection part 331b may include at least one second connection part 331b, and the at least one second connection part 331b may be positioned to be adjacent to at least one end of each of the first guide groove 311b and the second guide groove 321b.

In addition, the quantum dot bar container 301 may further include a light guide plate guiding part 340 positioned on at least one end of the second align hole AH2. The light guide plate guiding part 340 may be shaped of a thin plate. The light guide plate guiding part 340 may cover a side surface of the light guide plate 500, thereby allowing the light guide plate 500 to be accurately positioned in the second align hole AH2.

As described above, the connection part 331 includes the first connection part 331a and the second connection part 331b, thereby increasing mechanical strength of the quantum dot bar container 301. In addition, since the second connection part 331b is formed on at least one end of each of the first fixing part 311 and the second fixing part 321, the light emitted from the light source unit 200 may travel without being hampered.

Figure 12:
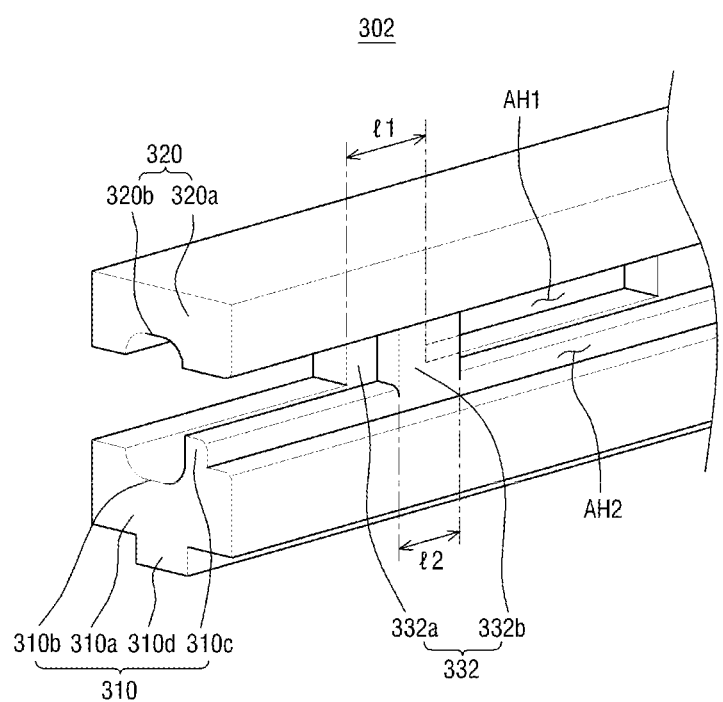
FIG. 12 is a perspective view illustrating a quantum dot bar container of a backlight unit according to still another embodiment.

FIG. 12 is a perspective view illustrating a quantum dot bar container (302) of a backlight unit according to still another embodiment. For the sake of convenient explanation, substantially the same elements as those of the previous embodiment are denoted by the same reference numerals, and repeated descriptions thereof will be omitted.

Referring to FIG. 12, a connection part 332 may include a first connection part 332a and a second connection pan 332b. Here, the first connection part 332a may be substantially the same as the connection part 330 of the previous embodiment. The second connection part 332b may connect a first protruding part 310c and a second fixing part 320 to each other, and the second connection part 332b may be positioned to face at least one of the plurality of first connection parts 332a. Here, a length 12 of the second connection part 332b in a first direction may be smaller than a length 11 of the first connection part 332a in the first direction.

As described above, the connection part 332 includes not only the first connection part 332a but the second connection part 332b, thereby increasing mechanical strength of the quantum dot bar container 302. In addition, even when the second connection part 332b is positioned to face the first connection part 332a, since the length 12 of the second connection part 332b in the first direction is smaller than a length 11 of the first connection part 332a in the first direction, the light emitted from the light source unit 200 is not shielded by the second connection part 332b, thereby minimally preventing the light from the light source unit 200 from being transferred to the light guide plate 500. By forming the length 12 of the second connection part 332b to be less than the length 11, shielding of the light from the light source unit 200 is minimized thus allowing a maximum amount of the light to get to the light guide plate 500.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the present embodiments be considered in all respects as illustrative and not restrictive, reference being made to the appended claims rather than the foregoing description to indicate the scope of the inventive concept.

What is claimed is:

1. A backlight unit, comprising:
   a first fixing part including a first guide groove extending in a first direction;
   a second fixing part facing the first fixing part and including a second guide groove corresponding to the first guide groove;
   a plurality of first connection parts each connecting the first fixing part and the second fixing part,
   wherein a quantum dot bar including quantum dots is slidably inserted between the first guide groove and the second guide groove,
   wherein the first fixing part includes a first protruding part protruding toward the second fixing part, and the first protruding part is positioned at a side of the first guide groove, wherein the first fixing part further includes a second protruding part protruding in an opposite direction to a direction in which the first protruding part protrudes,
   wherein a second align hole is formed at the side of the first guide groove and the second guide groove facing a one side of each of the first guide groove and the second guide groove, and the second align hole is defined by a surface of the side of the first guide groove, an upper surface of the first fixing part and a lower surface of the second fixing part;
   a light guide plate configured to guide light inserted into the second align hole such that an entire light incident surface of the light guide plate is directly between the upper surface of the first fixing part and the lower surface of the second fixing part; and
   a bottom chassis comprising a fastening groove having the second protruding part inserted therein.

2. The backlight unit of claim 1, wherein the first fixing part, the second fixing part and the plurality of first connection parts are integrated into a single body.

3. The backlight unit of claim 1, wherein the plurality of first connection parts are positioned to be spaced a predetermine distance apart from each other along one side of each of the first guide groove and the second guide groove.

4. The backlight unit of claim 3, wherein a plurality of first align holes are formed between the plurality of first connection parts, and a light source configured to emit light is inserted into each of the plurality of first align holes.

5. The backlight unit of claim 1, further comprising at least one light guide plate guiding part positioned on at least one end of the second align hole.

6. The backlight unit of claim 1, wherein the first protruding part is positioned between the first guide groove and the second align hole.

7. The backlight unit of claim 6, further comprising at least one second connection part connecting the first protruding part and the second fixing part.

8. The backlight unit of claim 7, wherein the second connection part is positioned to be adjacent to at least one end of each of the first guide groove and the second guide groove.

9. The backlight unit of claim 7, wherein the second connection part is positioned to face at least one of the plurality of first connection parts.

10. The backlight unit of claim 7, wherein a length of the second connection part in the first direction is smaller than that of a first connection part of the plurality of first connection parts in the first direction.

11. A backlight unit, comprising:
    a first fixing part including a first guide groove extending in a first direction;
    a second fixing part facing the first fixing part and including a second guide groove corresponding to the first guide groove;
    a plurality of connection parts each connecting the first fixing part and the second fixing part,
    wherein the first fixing part, the second fixing part and the plurality of connection parts are integrated into a single body,
    wherein the first fixing part includes a first protruding part protruding toward the second fixing part, and the first protruding part is positioned at a side of the first guide groove, wherein the first fixing part further includes a second protruding part protruding in an opposite direction to a direction in which the first protruding part protrudes,
    wherein a second align hole is formed at the side of the first guide groove and the second guide groove facing a one side of each of the first guide groove and the second guide groove, and the second align hole is defined by the surface of the side of the first guide groove, an upper surface of the first fixing part and a lower surface of the second fixing part;
    a light guide plate configured to guide light inserted into the second align hole such that an entire light incident surface of the light guide plate is directly between the upper surface of the first fixing part and the lower surface of the second fixing part; and
    a bottom chassis comprising a fastening groove having the second protruding part inserted therein.

12. The backlight unit of claim 11, wherein a quantum dot bar including quantum dots is slidably inserted between the first guide groove and the second guide groove.

13. The backlight unit of claim 11, wherein the plurality of connection parts are positioned to be spaced a predetermine distance apart from each other along one side of each of the first guide groove and the second guide groove.

14. A backlight unit comprising:
    a plurality of light sources arranged in a first direction and configured to emit light;
    a quantum dot bar positioned on the plurality of light sources and configured to convert wavelengths of light emitted from the plurality of light sources;
    a quantum dot bar container accommodating the quantum dot bar;
    a light guide plate positioned on the quantum dot bar container and configured to guide the light whose wavelengths are converted from the quantum dot bar to a display panel,
    wherein the quantum dot bar container comprises a first fixing part including a first guide groove extending in a first direction, a second fixing part facing the first fixing part and including a second guide groove corresponding to the first guide groove, and a plurality of connection parts each connecting the first fixing part and the second fixing part, and the quantum dot bar including quantum dots is slidably inserted between the first guide groove and the second guide groove, wherein the first fixing part includes a first protruding part protruding toward the second fixing part, and the first protruding part is positioned at a side of the first guide groove, wherein the first fixing part further includes a second protruding part protruding in an opposite direction to a direction in which the first protruding part protrudes, wherein a second align hole is formed at the side of the first guide groove and the second guide groove facing a one side of each of the first guide groove and the second guide groove, and the second align hole is defined by the surface of the side of the first guide groove, an upper surface of the first fixing part and a lower surface of the second fixing part, wherein the light guide plate is inserted into the second align hole such that an entire light incident surface of the light guide plate is directly between the upper surface of the first fixing part and the lower surface of the second fixing part; and a bottom chassis comprising a fastening groove having the second protruding part inserted therein.

15. The backlight unit of claim 14, wherein the first fixing part, the second fixing part and the plurality of connection parts are integrated into a single body.

16. The backlight unit of claim 14, wherein each of the plurality of light sources is positioned between the plurality of connection parts adjacent to each other.

17. The backlight unit of claim 14, wherein one end of the light guide plate is positioned between the first fixing part and the second fixing part.

18. The backlight unit of claim 14, wherein the first protruding part is positioned between the quantum dot bar and the light guide plate.

\* \* \* \* \*